United States Patent [19]

Smith et al.

[11] 4,249,698
[45] Feb. 10, 1981

[54] END GUN SEQUENCING APPARATUS AND METHOD

[75] Inventors: Neil C. Smith; Donald H. Scrutchfield, both of Fremont, Nebr.

[73] Assignee: Valmont Industries, Inc., Valley, Nebr.

[21] Appl. No.: 885,382

[22] Filed: Mar. 10, 1978

[51] Int. Cl.³ ............................................. B05B 3/00
[52] U.S. Cl. ................................ 239/1; 239/710; 239/177; 239/DIG. 1
[58] Field of Search .................. 239/177, 262, 1, 11, 239/DIG. 1; 137/344

[56] References Cited

U.S. PATENT DOCUMENTS

| | | | |
|---|---|---|---|
| 3,352,493 | 11/1967 | Curtis | 239/177 |
| 3,979,062 | 9/1976 | Christensen et al. | 239/177 |
| 4,011,990 | 3/1977 | Meis et al. | 239/177 |
| 4,161,292 | 7/1979 | Holloway et al. | 239/177 |

*Primary Examiner*—Johnny D. Cherry
*Assistant Examiner*—Michael J. Forman
*Attorney, Agent, or Firm*—Rogers, Eilers & Howell

[57] ABSTRACT

A center pivot irrigation system having an elongated concuit assembly with an inner end pivotally connected to a water source at a center pivot and having a plurality of discharge nozzles at spaced intervals along its length has one or more short range and a long range end gun mounted near the outer end of the conduit for irrigating the corner areas of a rectangular or square field. The long range end gun is adjusted to have a spray pattern which extends inwardly to provide water to that area normally irrigated by the sprinklers along the outer section of conduit in addition to an area extending beyond the outer edge of the arc farther than that covered by the short range guns. By turning off sprinklers along a section of conduit, water is diverted to help provide a sufficient pressure and flow rate as is necessary for efficient operation of the long range end gun.

The end guns are sequenced on and off by a control system using only one wire to transmit control signals to operate two different ranges of end guns. A switch and diode arrangement produces a series of positive going pulses for one range end gun and a series of negative going pulses for a second range end gun. The pulses are sensed by a latch relay circuit in combination with a second relay which senses the presence of either type of pulse to operate the solenoids controlling the flow of water to the end guns and sprinklers which are sequenced.

13 Claims, 8 Drawing Figures

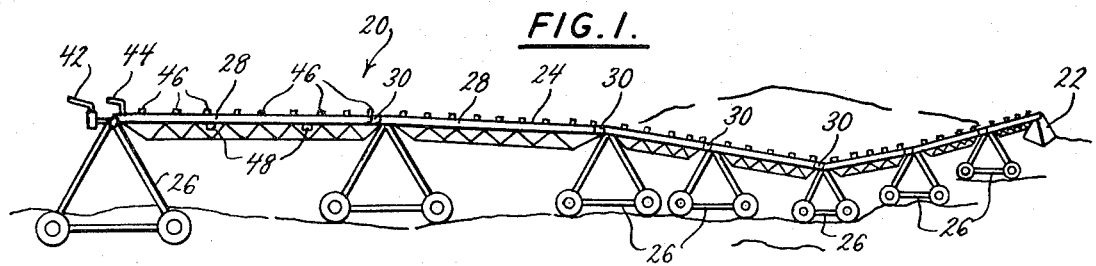
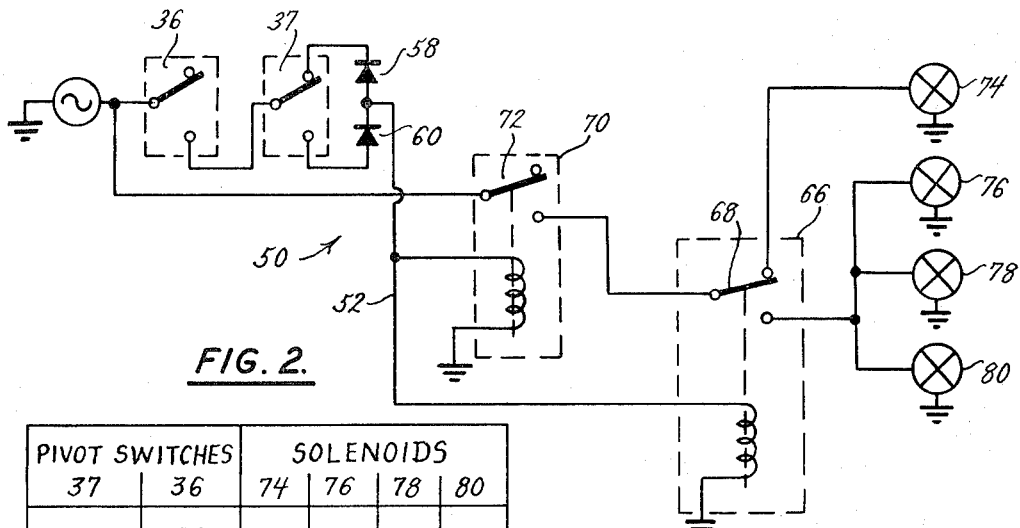
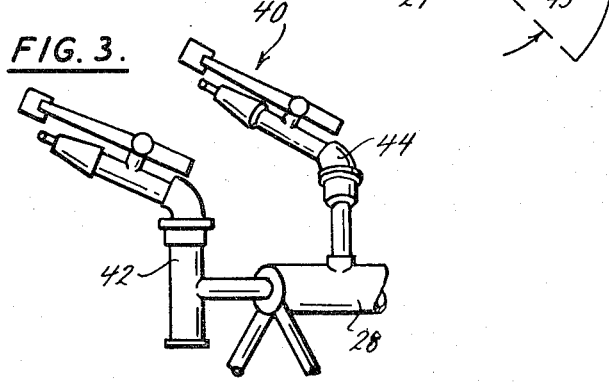
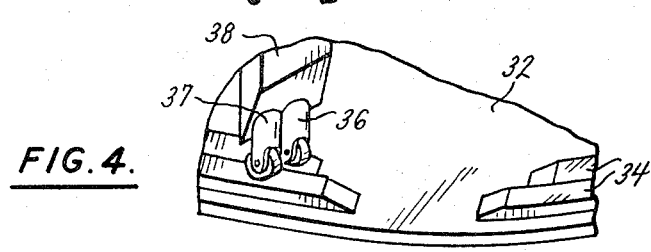
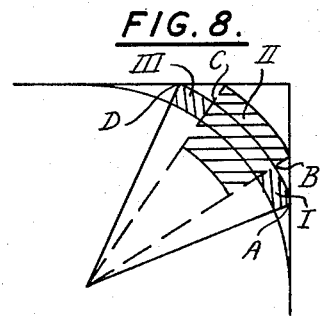
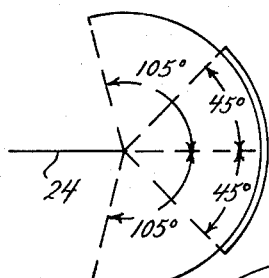
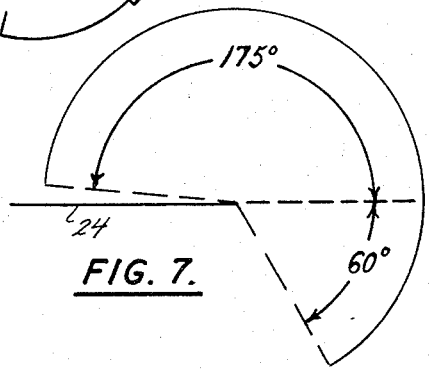

END GUN SEQUENCING APPARATUS AND METHOD

BACKGROUND AND SUMMARY

Center pivot irrigation systems are widely used for the irrigation of large agricultural areas. A center pivot system consists essentially of an elongated conduit which has one end fixedly secured at a center pivot around which the conduit is driven by a series of drive towers. Water is pumped into the conduit at the center pivot and exits the conduit through a plurality of sprinklers spaced along its length. The length of a commercial system of this kind may range from about 200 feet (61.0 meters) to over 1500 feet (457.2 meters). In any such system, because the inner portion of the radially extending conduit moves much more slowly than the outer portion, it is necessary and customary to provide for a substantially larger discharge of water at the outer end of the system than at the inner end. This control may be exercised in various ways as is known in the art including providing sprinklers or discharge nozzles with an orifice size varying from the inner end to the outer end in relation to the rate of water flow desired, or some type of programmed time control using discharge nozzles of uniform size, or some other method.

The conventional center pivot irrigation system covers a circular area out of what may be a rectangular or square field, leaving the corners unirrigated and also uncultivated. One of the ways that has been developed to at least partially irrigate the corners of a rectangular or square field has been to provide long distance sprayers or end guns mounted at the end of the conduit for spraying the water into the corner area as the conduit sweeps the adjacent central or primary area. The normal mode of operation calls for the end gun to be off when the outer end of the conduit is adjacent the edge of the field and on when the conduit sweeps adjacent a corner area or other odd shaped area. The control for the end guns is usually provided by some combination of switches and cams mounted at the center pivot which turns on the end guns as the system approaches the corner and off after the system has passed through the corner.

In the past, the use of end guns has been somewhat limited due to the water pressure balance problems experienced in the conduit when the end guns are cycled on and off as well as the maximum flow rate and pressure of the water supply which limits the effective operation of an end gun mounted at the extreme end of the system. A tremendous drop in pressure and flow rate is experienced along the conduit as the end guns are turned on, the end guns usually requiring a much higher pressure and flow rate than the nozzles along the conduit. This is especially a problem for the longer range end guns which spray up to twice as far and cover much greater areas than the short range end guns.

Some systems in the prior art use various combinations of short and long range end guns with their standard center pivot irrigation systems but these systems utilize sequencing operations requiring multiple sweeps or alternate starting and stopping beyond that normally used for controlling average speed in an effort to achieve an equal watering throughout the center circular area as well as the additional area beyond the periphery of the circle. In one of these systems, a short range and a long range end gun are mounted near the outer end of the conduit and are operated in one of two modes each requiring two or more sweeps to complete an irrigation cycle.

In the first mode of operation, the complete system must sweep through the field twice to complete an irrigation cycle. During the first sweep, the short range end guns are sequenced on during a first and last portion of sweep through the corner. During a second sweep, the conduit travels at 100% speed except for the middle portion of the corners. For its sweep through this section, the nozzles along the entire length of the conduit are turned off and the long range end gun is turned on to irrigate that portion of the field beyond the periphery of the circular area not irrigated during the first sweep. The speed of the conduit is set for approximately three times the speed used when the short range end guns are on as the long range end gun has an application rate of about three times that of the short range end guns.

There are several inefficiencies encountered in a system using the sequencing mode described above, including a watering imbalance between the corner areas and the central circular area, and application rates which vary widely between that of the long range end gun and the conduit discharge nozzles. Furthermore, the sequence requires at least two sweeps through a field which may be as much as a full 24 hours longer than one sweep.

In a second mode of operation, the same system may utilize four sweeps through the field in an attempt to equally water corner areas as well as the central circular areas. In this mode, the first three sweeps may be the same as the first sweep in the other mode of operation in that the short range end guns are turned on when the conduit sweeps through a first and last portion of the corner area. The long range end gun is not cycled on. For the fourth sweep through the field, the conduit operates much as in the second sweep of the previous mode in that the conduit travels at 100% speed but slows to the same speed that was used for short range end gun operation for its sweep through the middle portion of the corner. During its sweep through the middle portion of the corner, the long range end gun is cycled on and the nozzles along the length of the conduit are cycled off so that all of the water is diverted for operation of the long range end gun. As the long range end gun applies water at about three times the rate of the short range end guns, one sweep with the long range end gun will apply approximately the same amount of water as that applied by three sweeps with the short range end guns on.

This mode of operation provides a better balance of water throughout both the corner and the center portion of the field, but there still exists an imbalance because the center conduit must be turned off during its sweep through the middle portion of the corner to operate the long range end gun. Furthermore, the middle portion of the corner receives an excessive amount of water by the long range end gun as it must receive water equal to that received by other areas of the field during three or four sweeps of the conduit. This produces a large amount of run-off and inefficient irrigation as compared with a more balanced application rate as experienced by other portions of the field. Also, the time required to complete a full cycle of irrigation is four sweeps and not two as in the previous mode which may be as much as three days longer than that required to sweep through the field one time.

Another system which utilizes a short and long range end gun in combination with a center pivot conduit has a somewhat different sequencing method for irrigating a corner area. During a first part of the corner, a short range end gun is cycled on. During a large middle portion of the corner, the system operates in two alternate modes. The conduit will move for a short distance with the short range end gun on to irrigate partway into the corner, and then the conduit will stop, all the discharge nozzles along it will be turned off, and the long range end gun will be cycled on for a period of time to irrigate a portion of corner area beyond that irrigated by the short range end gun. The conduit will then start up again and will travel to another stopping point, with the short range end gun and the nozzles along the conduit on in between the two stopping points. There may be as many as ten stopping points through the middle portion of the corner to provide for an adequate amount of water to be delivered to the area beyond the short range end gun's reach. The system operates through the last portion of the corner as it did in the first portion, with the short range end gun on.

This mode of sequencing has inefficiencies due to the continual starting and stopping of the system which greatly increases the mechanical wear and tear, control system requirements, and maintenance problems. Furthermore, there must be a great deal more of overlap between the sprinkling patterns of the end guns as the short range end gun is used to irrigate between the central area and that area irrigated by the long range end gun. This, in addition to the multiple stopping of the system at selected locations requires that the watering patterns overlap much more than in a continually moving system to ensure that there are no areas which receive little or no water. Also, the time required for one sweep through the field is increased over that of a system which moves continuously through the field, although not as greatly as in the other systems.

Applicant has developed a system for balancing the water pressure and flow rate between the center pivot conduit and the end guns and which provides for an even distribution of water and application rates throughout both the area included within the arc as well as the area sprayed by both the long range and short range end guns. In addition, applicant's system utilizes a sequencing mode which equally irrigates all parts of the field with each sweep of a continuously moving conduit. It is to be understood that by "continuously moving" is meant that the conduit is always moving at an average speed in a manner customary in the art for controlling the normal operation of a center pivot irrigation system. It does not mean that the conduit is always moving at every instant of time as it is customary to control the average speed of a conduit by alternately stopping and starting a selected one or more of the control towers such as by use of a percent timer or the like. But, the system of the present invention is moving continuously at some average speed in the sense that the system is not made to stop at selected locations while one or more end guns operate.

In applicant's system, the sprinklers along an outer section of the conduit are turned off to increase the water pressure and flow available for use by the longer range end gun. By turning off this portion of conduit, applicant's system provides water at a sufficient pressure and flow rate to effectively operate the long range end gun at something less than maximum range. However, applicant's system at the same time continues irrigation along the majority of the conduit which eliminates the inefficiencies of the systems in the prior art. To compensate for the section of conduit that's off, the watering pattern of the longer range end gun is adjusted so that it sprays inwardly of the arc to irrigate the area normally swept by the outer section in addition to a substantial area beyond the arc and into the corner. This is made possible by the relatively greater capacity of the end gun as compared with the standard nozzles of the conduit. A typical long range end gun delivers approximately three times the water delivered by a section of conduit over equal areas. In applicant's system the spray pattern of the longer range end gun is adjusted to provide about two thirds of its spray beyond the outside of the arc and only about one third along the inside of the arc to balance the delivery of water.

Thus, a center pivot irrigation system may be provided with a short and long range end gun at its outermost end which will continuously irrigate an inner area as well as provide for the irrigation of land along two different ranges beyond the central arc with a balanced application of water and without the need to start and stop the conduit at selected locations or miss complete sections of land during a single pass of the system through the field.

As the watering pattern for end guns may be erratic in that they tend to distribute more water towards the periphery of their spray pattern, auxiliary sprinklers may be provided along the outer section of conduit to fill in any inconsistencies in the long range end gun coverage. These auxiliary sprinklers are generally very few in number and do not significantly reduce the amount of pressure and flow rate available for the longer range end gun.

Another feature of applicant's system is that it can be added to an existing center pivot system or supplied on new systems by the use of an existing control wire extending from the central pivot out to the periphery of the conduit where the end guns are mounted. This is important as the conduit may be up to 1500 feet (457.2 meters) long and extra wires would be substantially more expensive to supply and connect. With the one wire, applicant can operatively electrically select one of two ranges of end guns for operation in various parts of the corner area. This provides increased capability for spraying as one or more shorter range end guns may be used to fill in areas which could not be properly covered by a longer range end gun and a longer range end gun can be used to reach beyond the range of a short range end gun. A second short range end gun may be provided to increase the irrigation rate and improve the coverage.

BRIEF DESCRIPTION OF THE DRAWINGS

FIG. 1 is a perspective view of a center pivot irrigation system of this invention with two end guns mounted on the outermost section of pipe;

FIG. 2 is an electrical schematic of a control system of this invention used to provide the sequencing of the end guns;

FIG. 3 is a side elevational view detailing the two end guns;

FIG. 4 is a perspective view of the shut off ramps and micro switch operators located at the pivot;

FIG. 5 is a representational plan view of the spray pattern of an intermediate or short range end gun;

FIG. 6 is a representational plan view of the spray pattern of a tandem of intermediate or short range end guns;

FIG. 7 is a representational plan view of the spray pattern of a long range end gun;

FIG. 8 is a representational plan view of a corner of a field with the lined portions representing the areas irrigated by the various end guns.

DETAILED DESCRIPTION OF THE PREFERRED EMBODIMENT

Applicant's invention is used on a center pivot irrigation system 20 as generally shown in FIG. 1. The center pivot irrigation system 20 has a center pivot 22 located near a well or other source of water, a radially extending conduit 24 and a series of drive towers 26 which support the conduit 24 and drive the system in a circular path around the center pivot 22. These drive towers 26 are generally electrically operated and include sensors and controllers (not shown) to maintain the conduit 24 in an aligned condition as it is generally constructed of a series of rigid sections of pipe 28 joined by flexible couplings 30. At the center pivot 22, there is a mounting plate 32 (FIG. 4) having control ramps 34 to operate micro switches 36, and 37 which are mechanically coupled to the conduit 24 to give an indication of the conduit's position in the field. These micro switches are mechanically secured to a control box 38 which may contain additional electrical components (not shown) as is generally known in the art. At the outermost end of the conduit 24, and somewhere on the last section of pipe 28, one or more end guns 40 (FIG. 3) are mounted which are used to spray water beyond the end of the last section of pipe 28 so as to increase the number of acres (hectares) which can be irrigated with a given length of conduit 24. As is shown in FIG. 8, it is desirable to use a shorter range end gun 42 in the first and last portions of the corner and a longer range end gun 44 through the middle of the corner. By using these two different ranges of end guns 40, a significantly larger area of land can be irrigated over an arrangement whereby only a single range end gun is provided.

In applicant's preferred embodiment, a short range end gun 42 has been found to operate satisfactorily at the same average conduit speed used when no end guns 40 are on. The areas requiring short range end gun 42 operation may be controlled and sensed by the control ramps 34 and micro switches 36 and 37 mounted in the center pivot 22 as will be described in greater detail below. A different scheme is used whenever the long range end gun 44 is operated as its pressure and flow rate requirements are substantially greater than one or two short range end guns 42. Applicant has developed a scheme of sequencing which provides adequate pressure and flow rate at the outer end of the conduit 24 to operate the long range end gun 44 at a substantial portion of its maximum capabilities while still continuing to irrigate the inner area covered by the conduit 24. Applicant accomplishes this by shutting down the sprinklers 46 along an outer portion of the conduit 24 and diverting the water normally flowing through those sprinklers 46 to the long range end gun 44. Thus, the long range end gun 44 may be operated at levels which approach its maximum output and which, after being compensated for, do not appreciably affect the delivery of water by the inner section of conduit 24.

The end gun 40 nozzle sizes and flow rates, main pump pressure and flow rates, and other system parameters may be easily determined to provide an equal balance of water throughout the field by use of the following steps. First, a nozzle size and flow rate for the long range end gun 44 is chosen to accommodate the particular dimensions and shape of the field beyond the circular area irrigated by the conduit 24. Then, an application rate is determined by dividing the area to be watered by the long range end gun 44 into its gallons-per-minute (g.p.m) (liters-per-minute) rating. This application rate is then multiplied by the area of the field under the conduit 24 to determine a total system gallonage (literage) requirement. This number is then adjusted upward to ensure an overwatering capability. A pump is then chosen with a g.p.m. (liters-per-minute) equal to the calculated requirements which can also deliver a line pressure of 70 p.s.i. (4.9 kg./sq. cm.) at the outer end of the conduit 24 for operation of the end guns 40. The section of conduit 24 which is to be sequenced off is approximately equal to the effective range of the long range end gun 44 which can be calculated once the system parameters have been determined. In this manner, a balanced delivery of water is ensured throughout the area swept by the conduit 24 as well as that sprayed by the end guns 40 with a pump of minimum size to ensure reliable and efficient operation.

The spray pattern for the long range end gun 44 is adjusted as shown in FIG. 7 to water the inner arc area normally watered by that section of conduit 24 which is shut off in addition to spraying water beyond that area to reach farther sections of the corner area. The average speed of the conduit 24 is reduced when the long range end gun 44 is on and may depend somewhat on the amount of water being delivered to the land during one sweep of the irrigation system 20 as determined by the control setting (not shown) as is generally known in the art. One method for calculating and providing for a system slow down is disclosed in the Christensen, et al, U.S. Pat. No. 3,979,062 incorporated herein by reference.

OPERATION

A complete sequence of operation through a corner includes the following steps. As the conduit 24 reaches point A as shown in FIG. 8, one or more short range end guns 42, having a spray pattern substantially as shown in FIG. 5 for one gun or FIG. 6 for two guns, are turned on to deliver water to area I outside the arc normally swept by the center pivot system 20. This mode of operation is continued until the conduit 24 reaches point B as shown in FIG. 8. At this point, the average speed of the conduit 24 is reduced, the short range end guns 42 are turned off, nozzles 46 along the outer end of the conduit 24 are turned off, and the long range end gun 44 is turned on. The long range end gun 40 has a spray pattern substantially as shown in FIG. 7 which delivers approximately two-thirds of its water output to the area beyond the arc and one-third of its output inside the arc to replace that water which would have been sprayed by the sprinklers 46 contained within the section of conduit 24 sequenced off for this portion of operation. The number of sprinklers sequenced off may vary from system to system depending upon the system parameters including water source capacity and pressure, system length, and the long range end gun 44 operating characteristics. However, the length of conduit 24 sequenced off should be approximately as long as the effective range of the long range end gun 44 as it must apply water to the primary area usually watered by the nozzles 46 during this mode of operation. This mode of operation is continued to irrigate the area II until the conduit 24 sweeps into position C, whereupon the process is reversed.

At point C, the long range end gun 44 is turned off, nozzles 46 along the outermost portion of conduit 24 are turned back on, the short range end guns 42 are turned on and the average speed of the conduit 24 is increased to its initial value. This mode of operation is continued to irrigate area III until the center pivot system 20 reaches point D, at which point the short range end guns 42 are turned off. In addition, there may be one or more auxiliary sprinklers 48 which may be cycled on when one or more of the end guns 40 are on to help fill in the inner area of end gun spray patterns which generally receive a somewhat reduced amount of water. Thus, the entire center pivot system 20 may be "fine-tuned" to supply approximately equal amounts of water per unit area to the corners as that supplied to the inner areas with each revolution of the system being the same.

Applicant has developed a control system (FIG. 2) for implementing the end gun sequencing on center pivot irrigation systems 20. Applicant's control system 50 requires the use of only one interconnecting wire 52 which extends from the center pivot 22 to the outer end of the conduit 24 where the end guns 40 and some of their controls are located. Because of the substantial distance between the center pivot 22 and the location of the end guns 40, it is highly desirable to minimize the number of wires required to convey the control signals from the sequencing control located at the center pivot 22. Applicant's control system 50 requires only one additional wire 52 which results in a minimum amount of cost for both materials and labor.

Applicant's control system 50 includes micro switch 36 which senses the portions of travel requiring the short range end gun 42 to be on and micro switch 37 which is operated in addition to switch 36 for those sections requiring the long range end gun 44 to be on. Ramps 34 are used to operate micro switches 36, 37 by maintaining them in an off condition corresponding to those sections of the arc not requiring end guns 40 and sequencing them on for the corner areas as described above. Micro switches 36, 37 are shown connected in series so that when switch 36 comes on, a control signal for the short range end guns 42 is produced and when both switches 36, 37 come on, a control signal for the long range end gun 44 is produced. Other connections may be used with a corresponding change in the operating ramps 34 as is known in the art.

A pair of diodes 58, 60 are connected to the output of micro switch 37, so that a half wave rectified voltage is transmitted across the control wire 52 having a polarity directly related to which end gun 42, 44 is selected by micro switches 36, 37.

A polarized latch relay 66 senses the polarity of the control signal and either latches or resets a set of contacts 68 in response thereto. Any suitable polarized type of latch reset relay 66 may be used, including Potter-Brumfield catalog number KUL11A15S/120 or its equivalent. The control signal sent from the center pivot 22 is also directed to a relay 70 to sense the presence of a signal of either polarity which operates another set of contacts 72. Contacts 72, when closed, provide the operating voltage which feeds through latch reset relay contacts 68 to operate solenoids 74, 76, 78, 80 controlling the short range end gun(s) 42, the auxiliary sprinklers 48 along the outer section of conduit 24, the normal operation sprinklers 46 along the outer section of conduit 24, and the long range end gun 44, respectively. The relationships of the switches 36 and 37 to the solenoids 74, 76, 78 and 80 are shown by the chart of FIG. 2. As the operating sequence for solenoids 76 and 80 are the same, one solenoid may be used instead of two. The position of relay contacts 68 in either the latch or reset position must be accompanied by the presence of a signal along control wire 52 as sensed by relay 70 before any of the solenoids 74, 76, 78, 80 may be operated.

Thus, applicant has developed a control system 50 for controlling the operation of two different ranges of end guns 40 and their associated auxiliary sprinklers 48 through the use of a single control wire 52 which extends the length of the conduit 24.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. In an irrigation system having an elongated conduit assembly with an inner end pivotally connected to the water source at a central pivot point and having a plurality of discharge nozzles at spaced intervals along its length, drive means for moving the conduit assembly around the pivot point to irrigate a primary field area of approximately circular configuration, a first short range spray gun means and a second long range spray gun means secured substantially near the outer end of the conduit for irrigating a secondary field area beyond the periphery of the primary field area, the improvement comprising sequencing means to control the operation of the irrigation system to provide the same watering pattern for each complete revolution of the conduit wherein either the first or second spray gun means is operating whenever the conduit is in a primary field area adjacent a secondary field area, said second spray gun means being capable of spraying a substantially greater rate of water and with a range further into the secondary field area than said first spray gun means, said sequencing means including means to balance the water distribution in the conduit to accommodate the water requirements of each of said spray gun means and provide an approximately equal application of water to all areas being irrigated, the balancing means including means to operatively disable the discharge nozzles along a section of main conduit to proportionately increase the pressure and supply of water available to operate the second spray gun means, said second spray gun means irrigating that portion of primary field area otherwise irrigated by the disabled discharge nozzles.

2. The device of claim 1 wherein the sequencing means includes means to reduce the average speed of the conduit as it traverses a primary field area adjacent a secondary field area.

3. In an irrigation system having an elongated conduit assembly with an inner end pivotally connected to the water source at a central pivot point and having a plurality of discharge nozzles at spaced intervals along its length, drive means for moving the conduit assembly around the pivot point to irrigate a primary field area of approximately circular configuration, a first short range spray gun means and a second long range spray gun means secured substantially near the outer end of the conduit for irrigating a secondary field area beyond the periphery of the primary field area, the improvement comprising sequencing means to control the operation of the irrigation system as the conduit passes adjacent said secondary field area including means to sense the location of the conduit with respect to said secondary field area and control the operation of the spray gun means in relation thereto, means to operate a first spray gun means as the conduit sweeps through a first and last portion of primary field adjacent said secondary field, means to reduce the average speed of the conduit as it sweeps through a middle portion of primary field adjacent said secondary field, means to operate a second spray gun means during the sweep through said middle portion, said second spray gun means being capable of spraying a substantially greater rate of water and with a greater range than said first spray gun means, means to shut off discharge nozzles along an outermost portion of conduit and thereby increase the amount and pressure of water available for said second spray gun means, said second spray gun means having a spray pattern to provide water to the primary field area otherwise irrigated by said discharge nozzles shut off, auxiliary sprinkler means mounted along said outermost portion of conduit, and means to operate said auxiliary sprinkler means to fill in inconsistencies of spray pattern in said second spray gun means.

4. The device of claim 3 wherein the spray gun control means further comprises means to generate a first control signal corresponding to the first spray gun means and a second control signal corresponding to the second spray gun means, means to decipher said control signals and select the corresponding spray gun means, only one wire extending between the signal generating means and the deciphering means to conduct the control signals, and means to detect the presence of a control signal at said deciphering means to enable the selected spray gun operating means.

5. A method for irrigating a field including a primary area of substantially circular shape and one or more secondary areas beyond the periphery of the primary area with an irrigation system having an elongated conduit assembly with an inner end pivotally connected to a water source at a central pivot point and a plurality of discharge nozzles along its length, drive means for moving the conduit assembly around the pivot point to irrigate the primary field area, a first short range spray gun means and a second long range spray gun means secured substantially near the outer end of the conduit for irrigating a secondary field area without an articulated conduit member, said method comprising the steps of:

(a) sensing the location of the conduit as it approaches a primary field area near a secondary field area to initiate a sequencing means, (b) operating the first spray gun means during the sweep through a first portion of primary field near a secondary field to irrigate a portion of secondary field near the periphery of the primary field, (c) reducing the average speed of conduit travel for its sweep through a middle portion of primary field near a secondary field, (d) operatively disabling the discharge nozzles along an outermost portion of the conduit to increase the amount and pressure of water available for the second spray gun means, (e) operating the second spray gun means during the sweep through said middle portion to irrigate a portion of secondary field area extending substantially farther from the periphery of the primary field area than that covered by the first spray gun means and the portion of primary field area otherwise irrigated by the discharge nozzles sequenced off, (f) increasing the average speed of conduit travel after its sweep through said middle portion, and (g) operating the first spray gun means during the sweep through a second portion of primary field near a secondary field to irrigate a portion of secondary field near the periphery of the primary field.

6. The method of claim 5 wherein auxiliary sprinklers are mounted along the outer portion of the conduit and further comprising the step of operating said auxiliary sprinklers to fill in inconsistencies in the second spray gun means spray pattern.

7. The method of claim 6 wherein the first, middle and second portions of secondary field area are adjacent one another and further comprising the steps of operatively disabling the second spray gun means and the auxiliary sprinklers during the conduit's sweep through said first portion, operatively disabling the first spray gun means during the conduit's sweep through said middle portion, and operatively disabling the second spray gun means and the auxiliary sprinklers during the conduit's sweep through said second portion.

8. A method for irrigating a field including a primary area of substantially circular shape and one or more secondary areas each approximating a corner beyond the periphery of the primary area with an irrigation system having an elongated conduit assembly with an inner end pivotally connected to a water source at a central pivot point and a plurality of discharge nozzles along its length, drive means for moving the conduit assembly around the pivot point to irrigate the primary field area, first and second spray gun means secured substantially near the outer end of the conduit for irrigating each corner having a first, middle, and last portion wherein during a normal mode of operation both of said spray gun means are off and the conduit travels at an initial average speed, the method comprising the steps of operating in the normal mode as the conduit approaches a corner; sequencing on the first spray gun means at a point near the beginning of the first portion of the corner; sequencing off the first spray gun means and discharge nozzles along an outer section of conduit, sequencing on the second spray gun means, and reducing the average speed of the conduit at a point near the end of the first portion and the beginning of the second portion of the corner; sequencing off the second spray means, sequencing on the first spray gun means and discharge nozzles previously sequenced off, and increasing the average speed of the conduit to its initial value at a point near the end of the middle portion and near the beginning of the last portion of the corner; and returning the conduit to normal operation by sequencing off the first spray gun means at a point near the end of the last portion of the corner.

9. The method of claim 8 wherein auxiliary sprinklers are mounted along the outermost section of conduit and further comprising the steps of sequencing on said auxiliary sprinklers at the point near the end of the first portion and the beginning of the middle portion, and sequencing off said auxiliary sprinklers at the point near the end of the middle portion and the beginning of the last portion of the corner.

10. An electrical control system for controlling the operation of spray means mounted on a center pivot irrigation system comprising a sensing means to sense the position of a main conduit in the field and select a spray means corresponding to said position, means to generate a first signal corresponding to the selection of a first spray means and a second signal corresponding to a second spray means, means to decipher the selection signals and operatively electrically connect the first spray means in response to the first signal and the second spray means in response to the second signal, and only one wire interconnecting the generating means and the deciphering means for conducting the spray means selection signals.

11. The device of claim 10 further comprising means to detect the presence of a control signal at said deciphering means to enable the selected spray gun operating means.

12. The device of claim 11 wherein the first signal is a series of positive going pulses and the second signal is a series of negative going pulses.

13. An electrical control system for controlling the operation of spray means mounted on a center pivot irrigation system comprising sensing means including a pair of series connected micro switches to sense the position of a conduit in the field and operatively electrically select a first spray means or a second spray means, means to generate a series of positive going pulses in response to the selection of the first spray means and a series of negative going pulses in response to the selection of the second spray means, said generating means including at least a pair of diodes, a deciphering means, no more than one wire interconnecting the generating means and the deciphering means for conducting the series of pulses, an operating means including a latch relay, said latch relay having a set of contacts capable of controlling two circuits and a coil cooperating with the deciphering means to operate the contacts to open a second circuit and close and maintain a first circuit when positive going pulses are received and open the first circuit and close and maintain the second circuit when negative going pulses are received, means to detect the presence of pulses at the deciphering means, said detecting means having a set of contacts connected in series with the latch relay contacts, said detecting means closing its contacts upon detecting the presence of a series of pulses to supply power to said latch relay contacts, and a plurality of valve means controlled by the latch relay contacts to control the flow of water,

* * * * *